United States Patent [19]
Nally et al.

[11] Patent Number: 4,547,899
[45] Date of Patent: Oct. 15, 1985

[54] WAVEFORM MATCHING SYSTEM AND METHOD

[75] Inventors: Robert B. Nally; James F. Akister; Hung S. Ma, all of Waterloo, Canada

[73] Assignee: NCR Corporation, Dayton, Ohio

[21] Appl. No.: 431,923

[22] Filed: Sep. 30, 1982

[51] Int. Cl.⁴ .............................................. G06K 9/62
[52] U.S. Cl. ...................................... 382/7; 235/449; 382/30; 382/37
[58] Field of Search ................... 382/7, 29, 30, 34, 37; 235/449, 379

[56] References Cited

U.S. PATENT DOCUMENTS

| | | | |
|---|---|---|---|
| 3,643,215 | 2/1972 | Ingham et al. | 382/61 |
| 3,938,089 | 2/1976 | McGregor et al. | 340/146.3 D |
| 4,087,789 | 5/1978 | Beery | 340/146.3 C |
| 4,143,355 | 3/1979 | MacIntyre | 340/146.3 C |
| 4,143,356 | 3/1979 | Nally | 382/7 |
| 4,277,775 | 7/1981 | Nally et al. | 382/34 |

Primary Examiner—Leo H. Boudreau
Attorney, Agent, or Firm—Wilbert Hawk, Jr.; Albert L. Sessler, Jr.; Elmer Wargo

[57] ABSTRACT

A method and system of matching first and second waveforms, each having identifiable features, for identification purposes. The method includes the steps of obtaining from the first waveforms significant said identifiable features having values and locations with respect to a starting point of the associated said first waveform, with the significant identifiable features being obtained according to the predetermined criteria; utilizing values and locations of the significant identifiable features of a first waveform to search in predetermined locations for anticipated corresponding identifiable features in a second waveform; determining the values and locations of the identifiable features, if any, found in the predetermined locations; and comparing the values and locations from the determining step with the values and locations of the significant identifiable features of a first waveform according to second predetermined criteria to determine whether or not the second waveform matches a first waveform. The system includes a data acquisition module for obtaining the significant identifiable features mentioned, and a matching module for utilizing the significant identifiable features of the first waveforms to effect the comparing step mentioned.

29 Claims, 9 Drawing Figures

WAVEFORM MATCHING SYSTEM AND METHOD

BACKGROUND OF THE INVENTION

This invention relates generally to waveform matching for identification purposes, and more specifically, it relates to waveform matching as it is used, for example, to identify documents which are used in data processing.

One suitable application for this invention relates to the handling of documents such as bank checks or drafts and other media which are coded or printed in magnetic ink. For example, bank checks have printed thereon a MICR line (Magnetic Ink Character Recognition) which line includes, for example, an account number, bank number, and check number which are printed in magnetic ink.

In one system of banking, the record media such as bank checks and deposit slips, for example, are processed in an Entry or a First Pass Unit (FPU) where certain operations are performed. The record media are generally processed in groups or "batches" of about 250-300 checks per batch, for example. The MICR data is read from the checks for a batch of checks and the data read may be stored in a memory unit. At some subsequent operation, for example, the monetary amount of each check in the batch of checks is read or obtained by mechanical (character recognition) or manual methods, and the monetary amount is stored in a memory unit.

Continuing with the batch processing of bank checks, for example, the monetary amount for each check is then encoded or printed on the corresponding check and some physical sorting of the batch of checks may be done after the encoding is completed. The encoding and sorting is done, for example, at a second unit, referred to hereinafter as a Second Pass Unit (SPU). At this time, it is extremely important that the monetary amount for each check in the batch get actually encoded or printed on the correct check. In other words, the monetary amounts which are stored in memory, for example, must be encoded on the correct check. At the SPU, the MICR data is read again to provide a second reading which is compared with the first reading obtained from the FPU to make sure that the checks are properly identified and have remained in the same order. Assuming that the second reading from the SPU agrees with the first reading from the FPU, indicating that the check is properly identified, the monetary amount for that check is then encoded thereon, in the example described. Thereafter, the checks may be sorted by the SPU by various criteria as is conventionally done.

One type of comparison or verification performed with MICR data is to compare the second reading of each character of a MICR line of data with each corresponding character obtained from the first reading, as in the example described above; however, this type of comparison improperly or falsely rejects correct readings in about 1% of the comparisons. Naturally, when thousands of documents are to be sorted, even a small false rejection rate of 1%, for example, becomes cumbersome to correct manually. Another system for comparing entails matching the entire waveform received from the first MICR reading at the FPU with the entire waveform received from the second MICR reading at the SPU. Because the check transport mechanisms in the FPU and the SPU move the checks at different actual speeds even though the transports are designed to operate at the same speed, the correlation between first and second readings becomes progressively unsynchronized near the end-of-the-reading scans.

SUMMARY OF THE INVENTION

This invention relates to a method of matching first and second waveforms, each having identifiable features, for identification purposes, comprising the steps of: obtaining from said first waveforms significant one of said identifiable features having values and locations with respect to a starting point of the associated said first waveform, with said significant identifiable features being obtained according to predetermined criteria; utilizing said values and locations of said significant identifiable features of a said first waveform to search in predetermined locations for anticipated corresponding identifiable features in a second waveform; determining the values and locations of said identifiable features, if any, found in said predetermined locations; and comparing the values and locations from said determining step with the values and locations of said significant identifiable features of a said first waveform according to second predetermined criteria to determine whether or not the second waveform matches a said first waveform.

This invention also relates to a system for matching first and second waveforms, each having identifiable features, for identification purposes, comprising: means for obtaining from said first waveforms significant said identifiable features having values and locations with respect to a starting point of the associated said first waveform, with said significant identifiable features being obtained according to predetermined criteria; and means for matching said first and second waveforms to determine whether or not a second waveform matches a first waveform, comprising: means for utilizing said values and locations of said significant identifiable features of a said first waveform to search in predetermined locations for anticipated corresponding identifiable features in a second waveform; means for determining the values and locations of said identifiable features, if any, found in said predetermined locations; and means for comparing the values and locations from said determining means with the values and locations of said significant identifiable features of a said first waveform according to second predetermined criteria to determine whether or not the second waveform matches a said first waveform.

Some of the advantages of this invention are as follows:

(1) It reduces the false rejection rate mentioned for prior art systems;
(2) It is relatively simple and inexpensive to implement; and
(3) It is capable of matching first and second waveforms when using, for example, 12 out of a total of 30 characters of MICR data.

These advantages and others will be more readily understood in connection with the following specification, claims, and drawing.

DETAILED DESCRIPTION OF THE INVENTION

Figure 1:
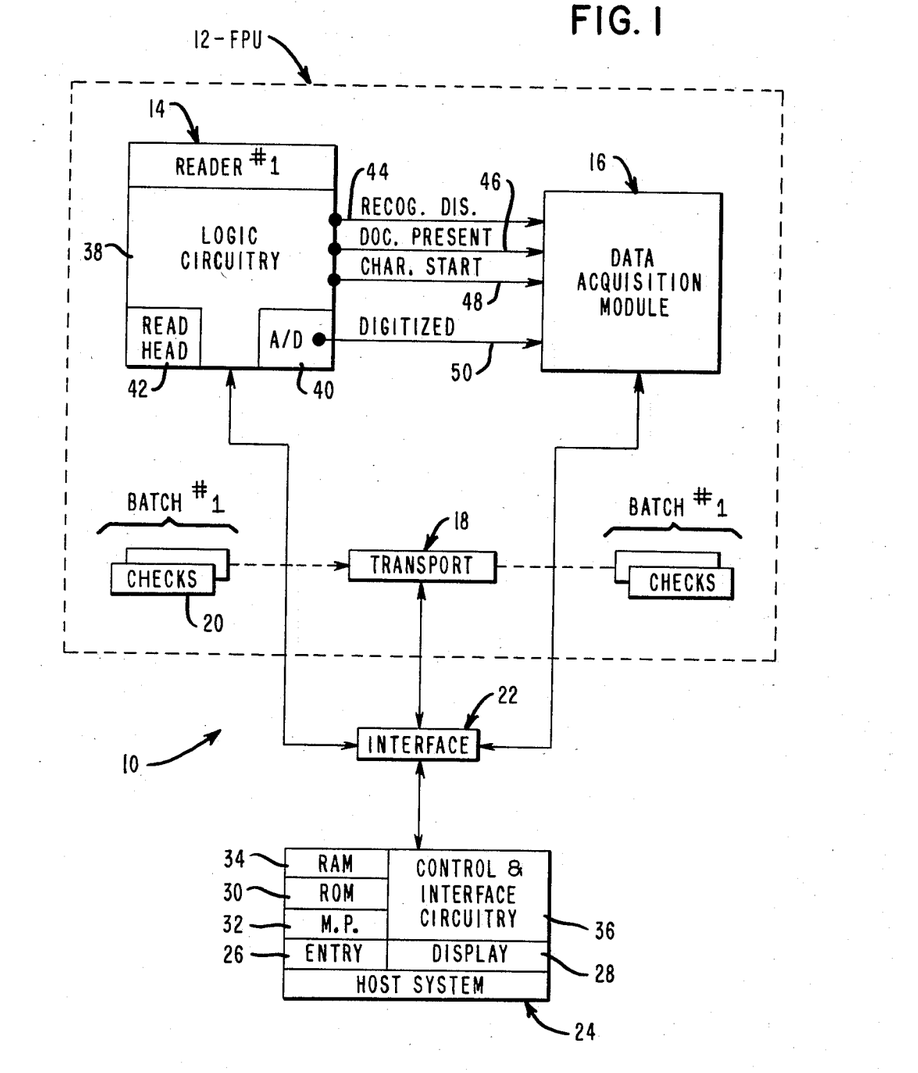
FIG. 1 is a schematic diagram, in block form, which shows a system or FPU in which a batch of record media such as checks is passed through a reader to read the MICR line of data, and also which shows a host system which receives the line of data.

FIG. 1 shows a portion of a general banking system 10 in which this invention may be used. The system 10 includes a First Pass Unit (FPU) 12, shown in dashed outline. The FPU 12 includes a MICR reader #1 which is designated as 14, a Data Acquisition Module 16, (referred to hereinafter as DAM 16), and a transport mechanism simply referred to as transport 18. The Reader #1 in the FPU 12 performs the function of reading the MICR line of data on each record medium or banking check in the embodiment described. The DAM 16 performs the function of acquiring data (as will be described hereinafter) from the record media, and the transport 18 performs the function of receiving a batch of checks like 20 and moving them serially, in reading relationship with the reader 14 and thereafter moving them out of the FPU 12.

The MICR line of data which is read by the reader 14 (FIG. 1) and the data which is acquired by the DAM 16 for each check of the batch 20 of checks may be forwarded via a conventional interface 22 to a conventional host system designated generally as 24. The host system 24 includes an entry means 26, a display 28 for communicating with a user of the system 24, a Read Only Memory (ROM) 30 for storing instructions and programs, a processor (MP) 32 for performing operations, a Random Access Memory (RAM) 34, and control and interface circuitry 36. As each check of the batch 20 of checks is read by the reader 14, the associated MICR line of data and other data is processed by the Reader #1 and the DAM 16, and certain data is forwarded thereafter to the RAM 34 of the host system 24 via the interface 22.

Figure 4:
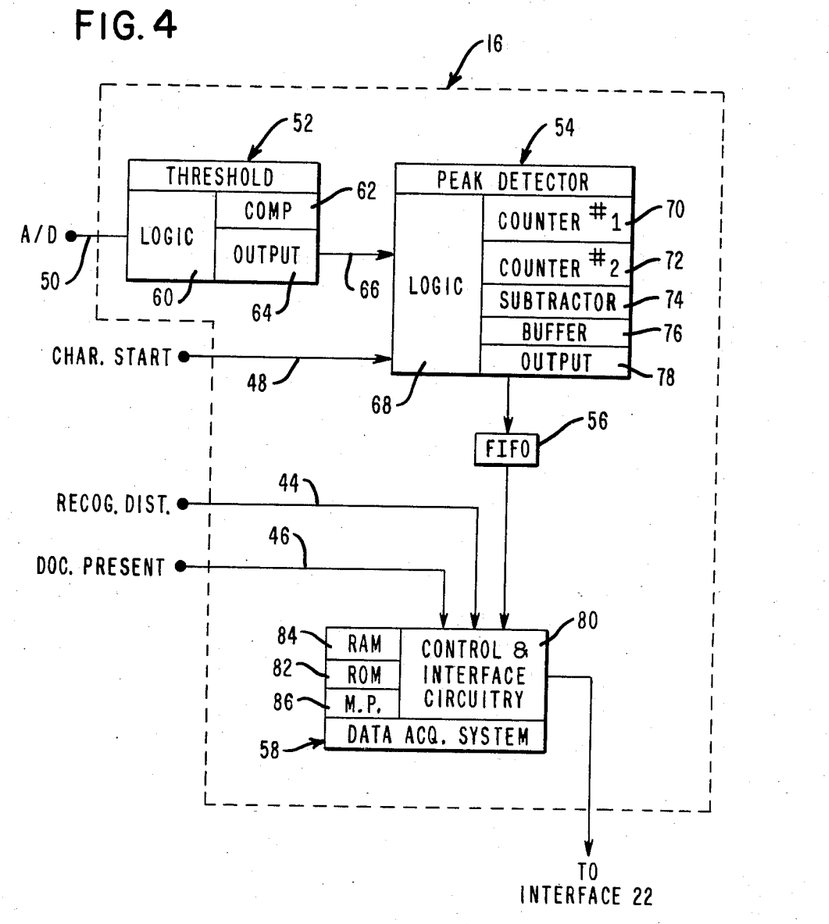
FIG. 4 is a schematic diagram, in block form, showing more details of the Data Acquisition Module (DAM) shown in FIG. 1.

The Data Acquisition Module (DAM 16) is shown in more detail in FIG. 4. Basically, the DAM 16 receives data from the reader 14 and treats it in a special way (to be described hereinafter) and then forwards the derived data to the host system 24 via the interface 22.

The reader 14 (FIG. 1) provides the DAM 16 with data on four different lines as shown. The reader 14 is conventional and it includes, for example, logic circuitry 38 and an analog to digital (A/D) unit 40. The logic circuitry 38 also includes conventional circuits to interpret the MICR waveforms as the checks 20 are moved in reading relationship with the read head 42. In the embodiment described, the MICR data is printed in a specific pattern such as an E13B font so that the MICR data or characters generate specific waveforms when they are read at a subsequent reading operation. The specific waveforms are digitized and compared conventionally with "templates" to produce numerical values or what are referred to as "recognition distances", which in effect, are used to identify the characters being read. These recognition distances are routed from the logic circuitry 38 of reader 14 to the DAM 16 over a line 44. Each time a document or check from the batch 20 of checks comes into reading relationship with the read head 42, the logic circuitry 38 produces a "document present" signal on line 46. Similarly, each time a new character on a check comes into reading relationship with the read head 42, the logic circuitry 38 produces a "character start" signal on line 48. The A/D unit 40 produces a "digitized image" of each character read on the line 50. In the embodiment described, the sampling rate of the read head 42 and the velocity with which the transport 18 moves each check past the read head 42 are such as to produce 128 samples for each character on a MICR line on the check. Naturally, the number of samples and sampling rate may be modified to suit particular applications. In the embodiment described, there are up to about 30 characters on a MICR line on each check.

Figure 5:
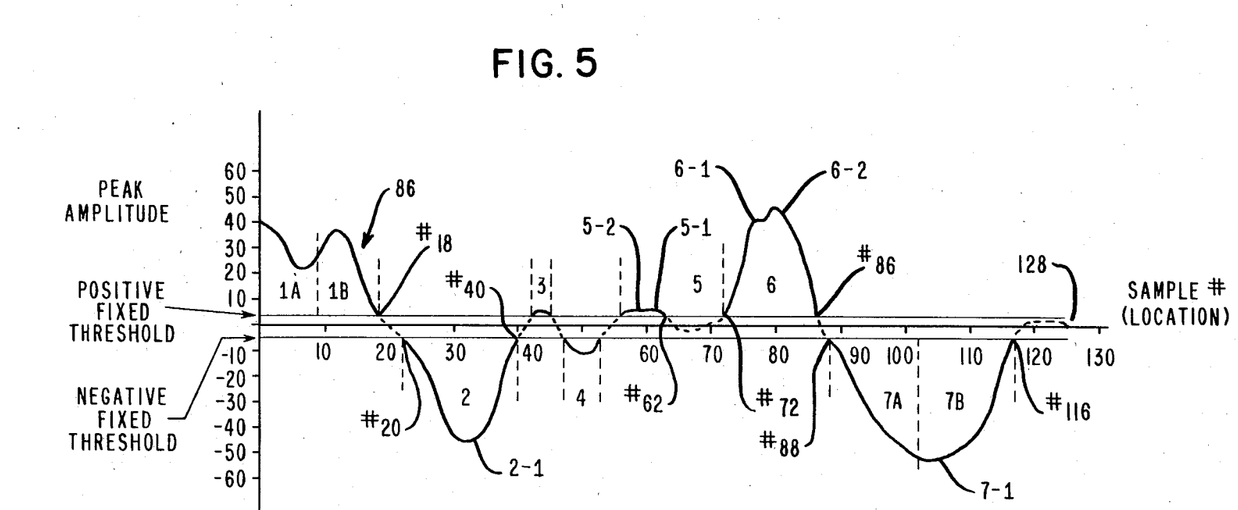
FIG. 5 is an analog, hypothetical, waveform associated with a MICR character which was read and which is used to portray a variety of situations involved in reading characters.

Because the analog waveform of each MICR character can have both positive and negative values, as shown by the hypothetical waveform of FIG. 5, it is necessary that the corresponding digitized output from the A/D unit 40 be capable of reflecting both positive and negative values. Accordingly, each of the 128 samples of digitized output from the A/D unit 40 for each character is comprised of an eight bit byte, with the first bit of the byte denoting a positive or negative value, and the remaining seven bits denoting the sampled amplitude. In the embodiment described, a positive value is designated by a binary 0 and a negative value is designated by a binary 1.

The various outputs from the reader 14 are forwarded to the DAM 16 over lines 44, 46, 48, and 50 as mentioned, with the DAM 16 being shown in more detail in FIG. 4.

The DAM 16 (FIG. 4) includes a conventional threshold circuit 52, a peak detector circuit 54, a First In, First Out memory unit hereinafter called FIFO 56 and a Data Acquisition System (DAS) designated generally as 58.

The threshold circuit 52 (FIG. 4) includes conventional logic 60, a comparator 62 and an output 64. The comparator 62 is designed to produce an output other than zero at output 64 only when the amplitude of the digitized value in the byte of data coming from the A/D unit 40 is above 4 for positive values of the digitized data and is below 3 for negative values of the digitized data. Digitized amplitude values of the hypothetical waveform result in zero when they are less than the positive and negative threshold values mentioned. Normally, the same threshold values for positive and negative digitized amplitude values would be used; however, the different values used in this embodiment are used to overcome certain sensitivity deficiencies in the particular read head 42 used.

In the embodiment described, 128 digitized samples (from sample #0 through sample #127) are outputted from the threshold circuit 52 (for each character on the MICR line being read by the read head 42) over line 66 to the peak detector circuit 54.

The peak detector circuit 54 includes logic circuitry 68 which receives the output from the threshold circuit 52 and also includes a first counter 70, a second counter 72, a subtractor circuit 74, a buffer 76, and an output 78. The operation of the peak detector circuit 54 will be described hereinafter.

The DAM 16 also includes the DAS 58 shown in FIG. 4. The DAS 58 includes control and interface circuitry 80, a ROM 82 for providing control and sequencing, a RAM 84 for providing temporary storage during processing, and a processor referred to as MP 86.

Figure 2:
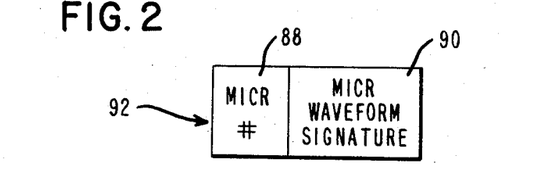
FIG. 2 is a schematic diagram showing the format of data which is received from the FPU and is stored in the host system.

To summarize, the DAM 16 receives a digitized waveform from an associated analog waveform (similar to hypothetical analog waveform 86 shown in FIG. 5) for each of the 30 characters on a MICR line on each of the checks in a batch like 20 in the embodiment described. The DAM 16 then selects 12 digitized waveforms (out of the 30 characters on a check) to be forwarded to the RAM 34 of the host system 24. The 12 digitized waveforms selected are those which have the greatest "recognition distances". In essence, a recognition distance close to zero means that a particular character read conforms to the matching "template" for that character. A large recognition distance means that the character read does not conform to one of the character templates anticipated on the MICR line. A large recognition distance may be due to a "blemish" in the printing of that character, for example; however, this "blemish" is unique and can help to identify the particular check at a second or subsequent reading of that check. That is why those characters with the largest recognition distances are saved and used to identify the associated check in subsequent passes or readings. Each one of the checks in a batch 20 of checks has an identification number such as a MICR number like 88 (FIG. 2) which identifies the particular check, and it also has the associated MICR waveform signature 90 forming part of a data string 92 which is stored in the RAM 34 of the host system 24 for each of the checks in a batch 20. In the embodiment described, the waveform signature 90 includes the 12 digitized waveforms (treated as hereinafter described) corresponding to the 12 characters out of 30 which are selected to identify the particular check when that check and batch 20 of checks are processed later in another terminal or unit such as the Second Pass Unit 94 (SPU) shown in FIG. 3, and as described, generally, earlier herein.

Figure 6:
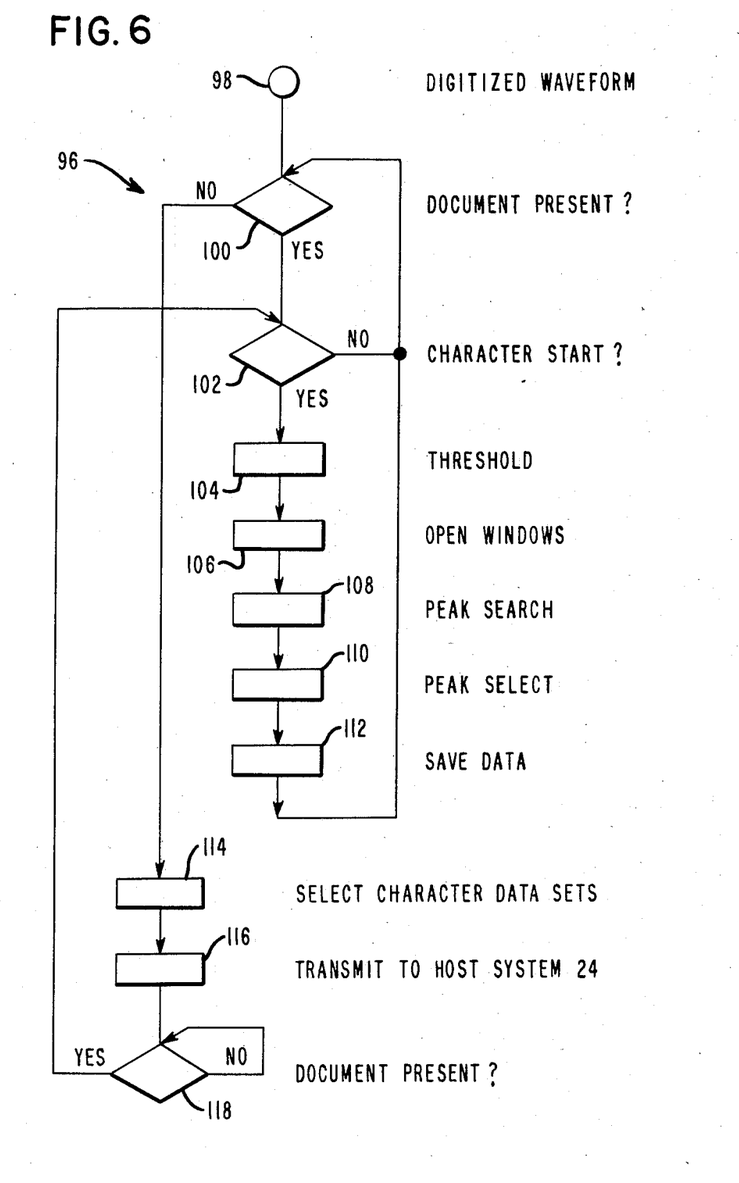
FIG. 6 is a flow chart associated with the DAM shown in FIG. 4.

As an aid in discussing the operation of the DAM 16 shown in FIGS. 1 and 4, it is beneficial to consider the associated process diagram or flow chart 96 shown in FIG. 6. The digitized waveform coming from the threshold circuit 52 into the logic 68 of the peak detector 54 is shown as step 98 of the flow chart 96. At step 100, the DAM 16 looks for a document present signal as, for example, on line 46 in FIG. 4 to ascertain whether or not a document or check is present at the reader 14. A document present signal activates the DAM 16. Assuming that a document or check is present, the DAM 16 then proceeds to step 102 to look for a character start signal (on line 48). If there is no character start signal, the DAM 16 returns to step 100 via the loop shown, and progresses to step 102 where the DAM 16 again looks for a character start signal.

Assuming that a character start signal occurs at step 102 in FIG. 6, the DAM 16 starts to utilize the output from the threshold circuit 52 as shown at step 104. After the thresholding step 104, the step 106 "open windows" is performed.

The step 106, "open windows", refers to the process of providing "parameters" or "end points" between which a search is made for a peak or peaks which may be included therebetween. For example, with regard to the hypothetical waveform 86 shown in FIG. 5, a window #6 starts at sample #72, the point at which the amplitude of the digitized waveform 86 rises above the positive fixed threshold level, and ends at sample #86 at which the amplitude of the waveform 86 drops below the threshold level. Within the window #6, there are two peaks marked 6-1 and 6-2; the treatment of these peaks will be discussed hereinafter.

Similarly, windows exist for negative values of the waveform #86 (FIG. 5) as shown by the window #2 which starts at sample #20 and ends at sample #40, with a peak 2-1 occurring in window #2. There are certain rules which are used to define or modify certain windows; these also will be discussed hereinafter.

As previously stated, there are 128 digitized samples (from #0 through #127) taken for each character in the embodiment described, and the sampling rate is 128K samples per second. The counter 70 in FIG. 4 is used to provide a running count of the samples and is reset to zero with each new character start signal. The counter 72 in FIG. 4 is used to count the number of samples which occur within a window, and as previously described, each digitized sample is recorded as an eight bit byte.

When the start of a window occurs, the subtractor 74 in the peak detector 54 (FIG. 4) is used to search for a peak located therein. This peak search (shown as step 108 in FIG. 6) is performed by examining sequential samples as they are received in a window. For example, if the $i^{th}$ sample is larger than the previous sample $(i-1)$, the slope is considered positive; if the $i^{th}$ sample is smaller or less than the previous sample $(i-1)$, the slope is considered negative. A slope of zero occurs when two consecutive, or sequential samples have the same value; this would be represented by a flat horizontal line in the waveform 86 shown in FIG. 5. When the subtractor 74 indicates a change in the slope from positive or zero to negative, indicating that a peak has occurred, a signal is created which causes the peak detector 54 to save the peak value and its sample location (from counter 70) in the buffer 76. It is possible that two peaks may exist within a window as shown by peaks 6-1 and 6-2 (FIG. 5) which exist in the window bounded by samples #72 and #86. Peaks also exist in the negative half of the waveform 86. For example, the highest negative peak in the window #2, which extends from sample #20 to sample #40, is peak 2-1.

There are also certain other situations handled by the peak detector 54 (FIG. 4) and represented by peak search step 108 in FIG. 6. The hypothetical waveform 86 shown in FIG. 5 relates to MICR characters as previously explained; consequently, because a MICR character always produces initially a positive-going pulse when read and ends with a negative-going peak, the first window always starts at sample #0, and the associated waveform has a positive value at that point. Another situation is that if the first opening or first window is greater or wider than 16 samples, the window is divided in half. The first window ends at sample #18 in FIG. 5 in the example portrayed. The first window is generally narrower than other windows because the character start circuitry (not shown) in the reader 14 will not indicate a "character start" signal 48 until the read head 42 (FIG. 1) is part way through the first peak of that waveform being read. In the example described, the first window (from sample #0–#18) is divided into two windows marked 1A and 1B as shown in FIG. 5, with the first window 1A extending from sample #0 to sample #9 and the second window 1B extending from sample #9 to sample #18.

Another situation handled by the peak detector 54 (FIG. 4) is that if a window has fewer than four samples included therein, the window is discarded as shown by window #3 in FIG. 5. For windows other than the first window, a window width larger than 20 samples is divided into two windows as shown by the windows 7A and 7B in FIG. 5. Prior to dividing, the associated larger window extended from sample #88 to sample #116. Because there is no slope reversal or peak in window 7A, this window data may be discarded; the peak 7-1 in window 7B is saved.

Another situation handled by the peak detector 54 (FIG. 4) is that of a "flat peak" as shown by window #5 in FIG. 5. As soon as window #5 is opened, the amplitude values from the reader 14 remain substantially constant so as to produce no change in slope for most of the width of the window. Finally, the subtractor 74 ascertains that there is a negative slope at sample #62 as the peak amplitude falls below the threshold value to close window #5. The logic 68, associated with the peak detector 54, will then position the "peak" at the center of the window #5 after ascertaining the number of samples in the window (from the count in counter 72). The sample number at the center of window #5 along with the "peak" value are then stored in the buffer 76.

Some additional comments with regard to the peak search step 108 in FIG. 6 are necessary. In a situation like the one portrayed in window 1A in FIG. 5 in which the waveform 86 is positive, there is no positive peak therein; another way of stating it is that the slope of the waveform 86 never changes from a positive slope to a negative slope in the window 1A, as it starts out at sample #0 (the first one) as a negative slope. In this situation, the digitized value of the waveform 86 located at sample #0 becomes the first "peak" value in the first window. This procedure applies only to the first positive window in the waveforms; all other windows require a change of slope to locate a peak. It should be recalled that the waveform 86 for each MICR character always starts in a positive direction and always ends with the waveform 86 on the negative side going towards the positive side as shown by window 7B.

After all the peak values for a character have been determined, the next step associated with the peak detector 54 (FIG. 4) is to select the peak or peaks to be saved for that character as shown by the peak select step 110 in FIG. 6. In general, the peak detector 54 selects a maximum of 3 peaks and a minimum of 1 peak in each of the positive and negative halves of the associated waveform like 86 in FIG. 5. As an aid in reducing the number of peaks prior to selecting the peaks to be representative of the associated character, the logic 68 of the peak detector 54 will examine the sample number (i.e. location) of each of the stored peaks and will discard that peak which is within 10 samples of a nearby peak and also is the smaller of the two peaks. It should be recalled that at this time the digitized value of a peak amplitude (consisting of seven bits for its numerical value and one bit relating to its being positive or negative) and the sample number or location of the peak are stored in the buffer 76. After a count of 127 (in the embodiment described) is obtained on counter 70, indicating the end of a character being read, the logic 68 withdraws the peaks from the buffer 76 and arranges them in descending order of peak amplitude to begin the selection of peaks associated with step 110. Thereafter, the logic 68 performs certain operations on the ranked peaks. If the largest peak (for positive values) has a value which is four times greater than the second largest peak, then only the largest peak is saved and the remaining peaks are discarded. This is done because due to the nature of the MICR waveform, the second and smaller peaks are probably only noise peaks in this situation. If the second peak is larger than one fourth of the size of the largest peak, then the second peak is saved. If a third peak exists, in order to be saved it must be larger than the sum of the first and second largest peaks divided by five, otherwise it is discarded. It should be noted that because there are both positive and negative halves, there will be a maximum of 6 peaks and a minimum of 2 peaks saved for each character being read in the example described.

After the peaks or peak values are selected as represented by the peak select step 110 in FIG. 6, they are outputted from the output 78 (FIG. 4) and are stored in the FIFO 56 as represented by the step 112. The FIFO 56 is a memory device which is arranged to sequentially store the peak values saved along with their sample locations for each character being read. From step 112 in FIG. 6, the routine returns to step 100 to repeat the process described for a new or the next character.

At the time that peak values are being ascertained and stored as just described for each character, the recognition distance for each character scanned at the reader 14 is calculated therein and forwarded over line 44 to the DAS 58 (FIG. 4) where it is stored in the RAM 84 therein. After all the MICR characters are read on the document passing through the reader 14, a point will be reached at which the document will no longer be present at step 100 in FIG. 6. From step 100, the routine proceeds to step 114 at which the 12 "characters" or data sets out of 30 characters (in the embodiment described) are selected to identify the associated document. The 12 characters selected are those which have the greatest recognition distances as previously explained; these are the ones that are most expressive of uniqueness of the associated document. A conventional software routine stored in the ROM 82 (FIG. 4) may be used to select the 12 characters out of 30. After the 12 characters are selected, the corresponding peak value data located in the FIFO 56 is then selected and transferred (in step 116 in FIG. 6) from the control and interface circuitry 80 of the DAS 58 (via the interface 22) to the host system 24 where the data is stored in the RAM 34 therein. When a new document is presented to the reader 14, and a new document present signal is generated as at step 118 in FIG. 6, the routine shown therein returns to step 102 to repeat the process described for the first character to be read on the new document. It also should be recalled that the data stored in the RAM 34 for each of the 12 characters selected for each document includes the peak values and their associated sample numbers; this data, referred to as the MICR waveform signature 90 (FIG. 2), is included for each of the documents in a batch (like 20) of documents along with the MICR #88 for that document. The MICR #88 is developed conventionally from the recognition distances.

When the batch 20 of documents is to be read again, it is passed through a reader as was done in FIG. 1. Such a reader like 120 in FIG. 3 may be part of the second pass unit (SPU) 94 as previously explained. To show how the second reading of the batch 20 may be utilized, it is customary to print or encode in MICR printing the monetary amount of each check on the check itself. The monetary amount of the check may be entered into the host system 24 conventionally as by manual entry. An operation which the SPU 94 performs is to encode in MICR printing the associated monetary amounts on the checks in a batch 20 as previously stated. A conventional encoder and sorter 122 is used to encode the amount on a check. It is important that the correct monetary amount be encoded on the appropriate check. Each of the checks is moved in reading relationship with MICR reader 120 by a conventional transport 124 which subsequently also moves each of the checks in printing relationship with the encoder and sorter 122. Those checks which are properly identified are encoded and exited from the SPU 94 via the encoder and sorter 122 to form an encoded batch 20-1 of checks. Those checks which are not properly identified, for example, are exited from the encoder and sorter 122 to form a reject batch 20-2 of checks.

The waveform matching at the SPU 94 (FIG. 3) is effected in conjunction with a matching module 126. Basically, the function of the matching module 126 is to receive the first pass data retained in the host system 24 from the FPU 12 (which data is referred to as reference data) and compare the reference data with the second pass data developed in the SPU 94 (which data is referred to as test data). When the test data matches the reference data, the matching module 126 indicates a "match" to the encoder and sorter 122 to enable the encoder to print data on the particular check just read at the reader 120 in the embodiment described. If no match between reference and test data occurs, the particular check just read is rejected by the encoder and sorter 122 to batch 20-2 as previously described.

The SPU 94 (FIG. 3) is coupled to the host system 24 via a conventional interface 128, and the SPU 94 also includes a conventional SPU processing system 130, which includes control and interface circuitry 132, a ROM 134 for storing the associated programs, a RAM 136, and a processor (MP) 138. Suitable lines (not shown) extend from the control and interface circuitry 132 to the MICR reader 120, transport 124, and encoder and sorter 122 to provide conventional control where necessary or desirable.

Figure 7:
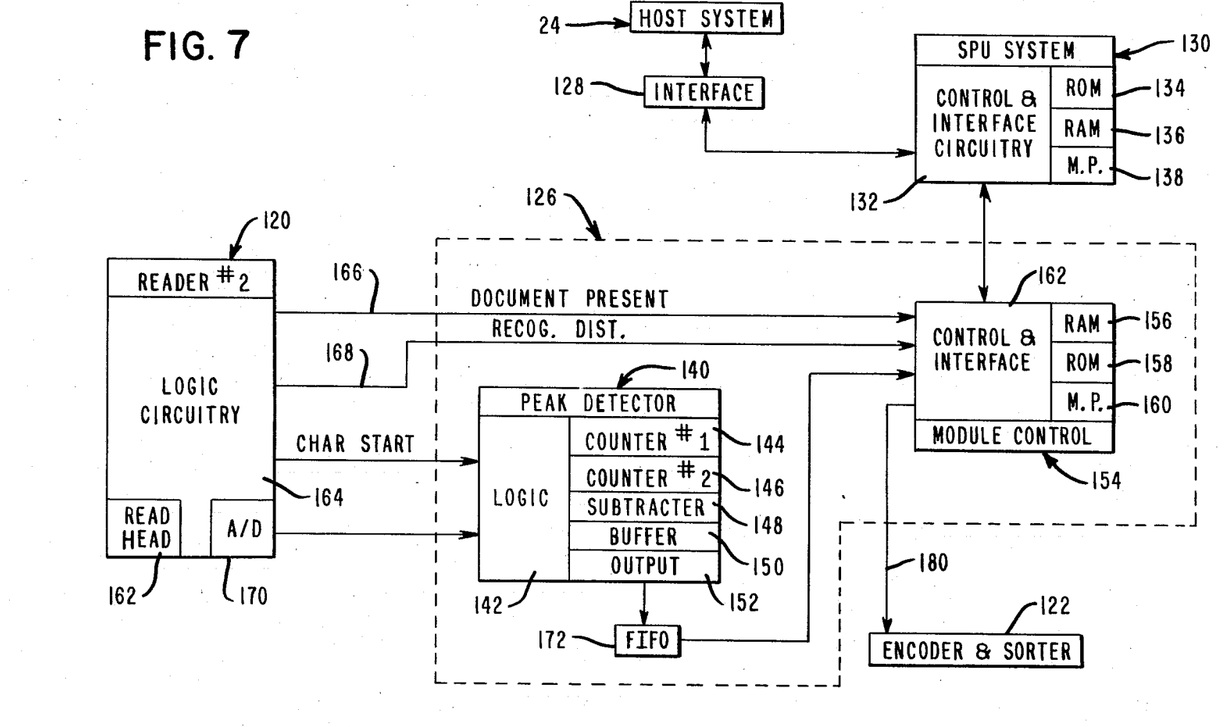
FIG. 7 is a block diagram showing additional details of the matching module shown in FIG. 3.

The matching module 126 (FIG. 3) is shown in more detail in FIG. 7, and it includes a peak detector 140 which is identical to the peak detector 54 (FIG. 4) already described. The peak detector 140 includes logic 142, counters 144 and 146, a subtractor 148, a buffer 150 and an output 152 which all function in the same manner as do the corresponding elements already described with regard to peak detector 54.

The matching module 126 (FIG. 7) also includes a module control designated generally as 154 and which includes a RAM 156, a ROM 158 (for storing instructions), a MP 160, and control and interface circuitry 162.

When the batch 20 of checks is to be passed through the SPU 94, some conventional preliminary work is done first. For example, a header card (not shown) but associated with the batch 20 of checks may be used to access the appropriate data strings 92 (FIG. 2) from the host system 24. When the batch 20 of checks is to be passed through the reader 120 in the SPU 94, the SPU system 130 (FIG. 7) downloads the data strings 92 to the module control 154 where they are momentarily stored in the RAM 156; this is the reference data as previously described, and it is transferred just prior to what is expected to be data from the same document derived from the read head 162 of the reader 120. The logic circuitry 164 of the reader 120 produces a document present signal on line 166, and also may produce the associated recognition distance on line 168, which lines 166 and 168 are coupled to the module control 154 for use thereby. A character start signal developed by the logic circuitry 164 is utilized by the peak detector 140 as previously explained with regard to peak detector 54. An A/D converter 170 converts the analog waveform read from the MICR line at the read head 162 to a digitized output which is forwarded to the logic 142 of the peak detector 140. The output of the A/D 170 is not thresholded prior to entering the associated peak detector 140 as was done in the FPU 12. The peak detector 140 produces peaks or the "test data" for each character on the associated MICR line of data on a check being read in the same manner with regard to peak determination as was done with the peak detector 54 in the FPU 16. The test data or peaks for each of the characters are forwarded from the peak detector 140 to the FIFO memory 172. This test data or peak data includes its discrete value as previously described and its associated sample number which is intrinsically located or positioned in the FIFO memory 172 whose output is fed into the module control 154.

It should be recalled that the peaks associated with only 12 characters out of a total of 30 characters for a check are used as reference data (in the example described) to identify the check in the waveform matching technique disclosed herein. If, for example, the first character selected as reference data were the 4th out of 30 characters, the associated reference data would be located in the RAM 156 of the module control 154 (FIG. 7). The test data or peaks coming from the FIFO memory 172 for the first three characters are disregarded by the module control 154, and the direct waveform matching begins when the test data for the fourth character arrives at the module control 154.

Continuing with the example just given, the reference data or peaks for the 4th character are used to open up search windows with regard to the incoming test data or peaks from the FIFO memory 172 (FIG. 7). In other words if a reference peak occurs at sample #14 (out of 128 samples), one would expect a similar peak to be found at sample #14 in the test data. Because there may be some variation in the sensitivities of the readers in the associated FPU 12 and the SPU 94 and the speeds of their associated transports 18 and 124, for example, it is necessary to provide some adjustment or enlargement in the size of the search windows when searching for the test peaks. The window boundary locations are given by the following equation:

$$WB = X_{ri} \pm ([6] + [2]\% \text{ of } X_{ri}), \qquad \text{Eq. \#1}$$

wherein
WB = window boundary, and
$X_{ri}$ = the $i^{th}$ reference peak.
The brackets within the parenthesis of Eq. 1 indicate that the values within the brackets may be changed as a result of experimentation or for different applications. As an illustration of Eq. 1, the window boundaries for sample #40 are given by:

$$WB_{40} = 40 \pm (6 + 2\% \times 40).$$

Notice that with Eq. 1, the window size increases as the reference peak location increases. In other words, reference sample #120, for example, has a wider window than reference sample #20. By allowing the window size to increase as the reference peak location increases, variations in the speeds of the transports 18 and 124 will have a lesser effect on the ability of the matching module 126 to find the test peaks.

There are some other factors which affect the determination of the search window boundaries; they are:

(1) The leading boundary of a search window may not precede the start of a character, and the trailing boundary of a search window may not exceed 127 samples from the start of a character in the embodiment described;

(2) The leading boundary of a search window may not precede a previously detected peak, so that when two reference peaks are located close to each other, the same test peak will not be selected twice; and (3) When the MICR line of data on the checks is printed with a low-intensity ink, it is necessary to expand the window size because the peaks produced by the low-intensity ink are generally low and poorly defined. Accordingly, if a reference peak for a particular sample # has a value of a predetermined amount, as for example when the reference peak value is less than or equal to 7 in the embodiment described, the window boundary limits are given by the following equation:

$$WB = X_{ri} \pm [10]; \ (y_{ri} \leq 7) \qquad \text{Eq. 2}$$

wherein: $y_{ri}$ indicates the value of the $i^{th}$ reference peak. Note that with Eq. 2, the window boundaries are independent of $X_{ri}$. Factors (1) and (2) above apply to the situation associated with factor (3) just described.

To review, the window boundaries have been determined from the reference data in order to search for the test data or peaks. The peak detector 140 (FIG. 7) calculates or determines the peaks in the same general manner as does peak detector 54 (FIG. 4) already described. Assuming that the checks in a batch of checks are in the proper order, the test peaks obtained from the SPU 94 should match the reference peaks obtained from the FPU 12.

While a test peak may be found in a window boundary derived from the reference data or peaks, the waveform matching of this invention also includes some additional steps or operations which evaluate the amount by which a test peak varies from its reference location and value. The steps may be generally described as follows:

(1) The amount by which a test peak varies from its reference location and value, respectively, are referred to generally as the "x" or position difference (distance) and the "y" or amplitude difference (distance).

(2) The x and y distances are developed for each character, and then, an "overall distance" is calculated (by certain steps to be hereinafter described) for each character.

(3) The "overall distance" for each character along with certain other criteria are used in developing "acceptance" or "rejection" criteria in deciding whether or not a match exists, i.e., Is the check in the SPU 94 the check corresponding to that one which produced the reference data from the FPU 12?

Figure 8:
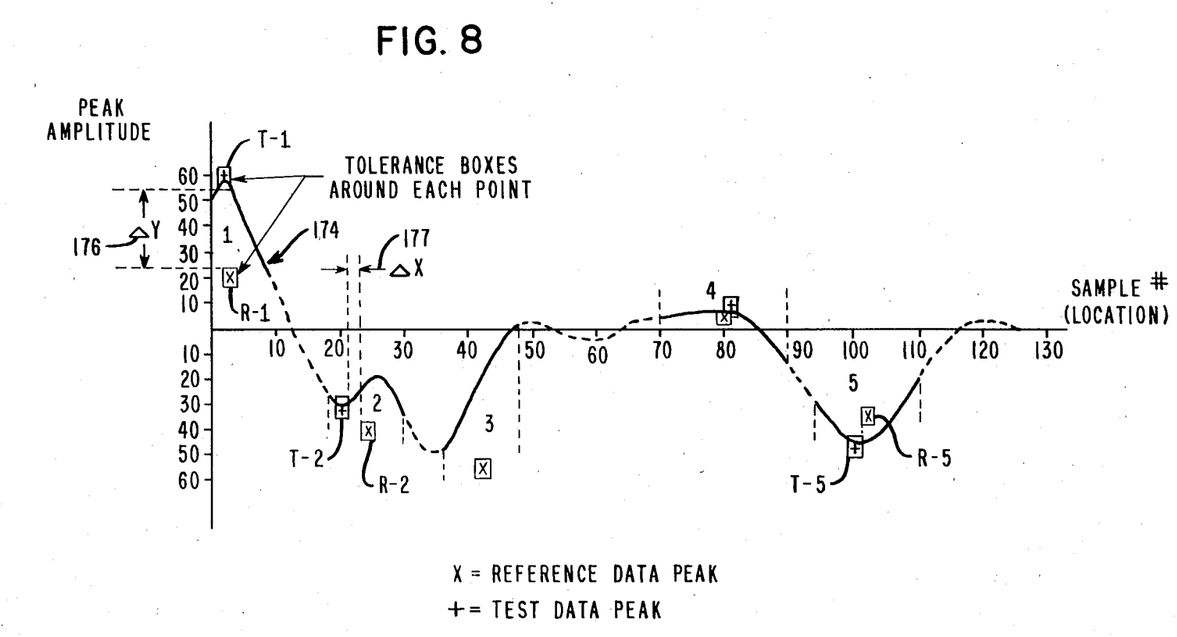
FIG. 8 is an analog hypothetical waveform used to portray different situations in a peak matching operation.

The development of the x position distances and the y amplitude distances can be more readily understood in connection with FIG. 8. First, a tolerance box is constructed around each of the reference peak points and the test peak points according to the following formulae:

$$y_{lim} = y \pm [3]\% \text{ of } y \qquad \text{Eq. 3;}$$

and $$x_{lim} = x \pm [1] \qquad \text{Eq. 4;}$$

wherein:
y is equal to the peak value, and
x is equal to the peak position (sample number).

FIG. 8 shows tolerance boxes which are constructed around reference data peaks and test data peaks associated with an illustrative waveform 174. A box designated as R-1 is associated with a reference data peak and the box designated T-1 is associated with a test data peak, and similarly, the box designated R-2 is associated with a reference data peak and the box designated T-2 is associated with a test data peak. Note from Eq. 4 that the x limits of the tolerance boxes are fixed; however, these values can be changed readily if field trials indicate the need to do so. Note, also, that a reference data peak is marked with an "x" in FIG. 8, and a test data peak is marked with a plus (+) sign.

After the tolerance boxes have been constructed for the reference data peaks and the test data peaks for the x and y directions, the distances between these tolerance boxes are calculated separately. The general rule is that the distance between the reference and test data peaks is calculated by subtracting the test data peak from the reference data peak. The result may be either positive or negative depending upon which data peak is the larger of the two. If the tolerance boxes of the reference and test peak data values overlap or touch in one direction, the distance in that direction is zero. With regard to waveform 174 in FIG. 8, because the reference data peak R-1 and the test data peak T-1 overlap in the x direction, for example, the distance in the x direction or $\Delta x$ is equal to zero. An example of a $\Delta y$ distance is shown with reference numeral 176 in FIG. 8. An example of a $\Delta x$ distance is shown with reference numeral 177 which shows the distance between reference data peak R-2 and test data peak T-2.

When all the peaks have been found in the test data, and the x and y distances therefor have been calculated as just explained, an overall distance for each character is generated by the following formulae:

$$D_x = \frac{1}{n} \sum_{i=1}^{n} \Delta x_i^2 - \left[ \frac{1}{n} \sum_{i=1}^{n} \Delta x_i \right]^2; \qquad \text{Eq. 5}$$

-continued $$D_y = \frac{1}{n} \sum_{i=1}^{n} \Delta y_i^2 - \left[\frac{1}{n} \sum_{i=1}^{n} \Delta y_i\right]^2;  \quad \text{Eq. 6}$$

and $$D_{Total} = D_x + D_y; \quad \text{Eq. 7}$$

wherein, n = the total number of peaks in the character, positive and negative combined;

$\Delta x_i$ = the positional distance calculated as just described for the $i^{th}$ peak; and $\Delta y_i$ = the amplitude distance calculated as just described for the $i^{th}$ peak.

The term within the brackets in Eq. 5 serves to subtract out or to reduce constant positional shifts caused by "character start" variations associated with the readers (like 14) involved. Similarly, the term within the brackets in Eq. 6 serves to subtract out or to reduce constant amplitude shift caused by a DC offset in the associated readers. Eq. 7 is simply a total of $D_x$ and $D_y$.

Some additional comments seem appropriate with regard to the various equations just reviewed. In the event that no test peak is discovered within a window as previously described, no distance is accumulated. In this situation, a separate counter (not shown) but associated with the module control 154 is incremented, and the count itself is used as one of the overall acceptance/rejection criteria to be later described herein.

The entire process of test peak searching and distance calculation associated with Equations 1–7 already described is repeated for each of the 12 characters (out of 30) selected to identify a particular check in the SPU 94. After the distances for each character are obtained, the following quantities are calculated:

(1) The average distance for each character;
(2) The average distance in the y direction for only that character which has the largest total distance; and
(3) The standard deviation of the distance in the y direction namely $\Delta y_i$ for that character defined in (2) above.

Figure 3:
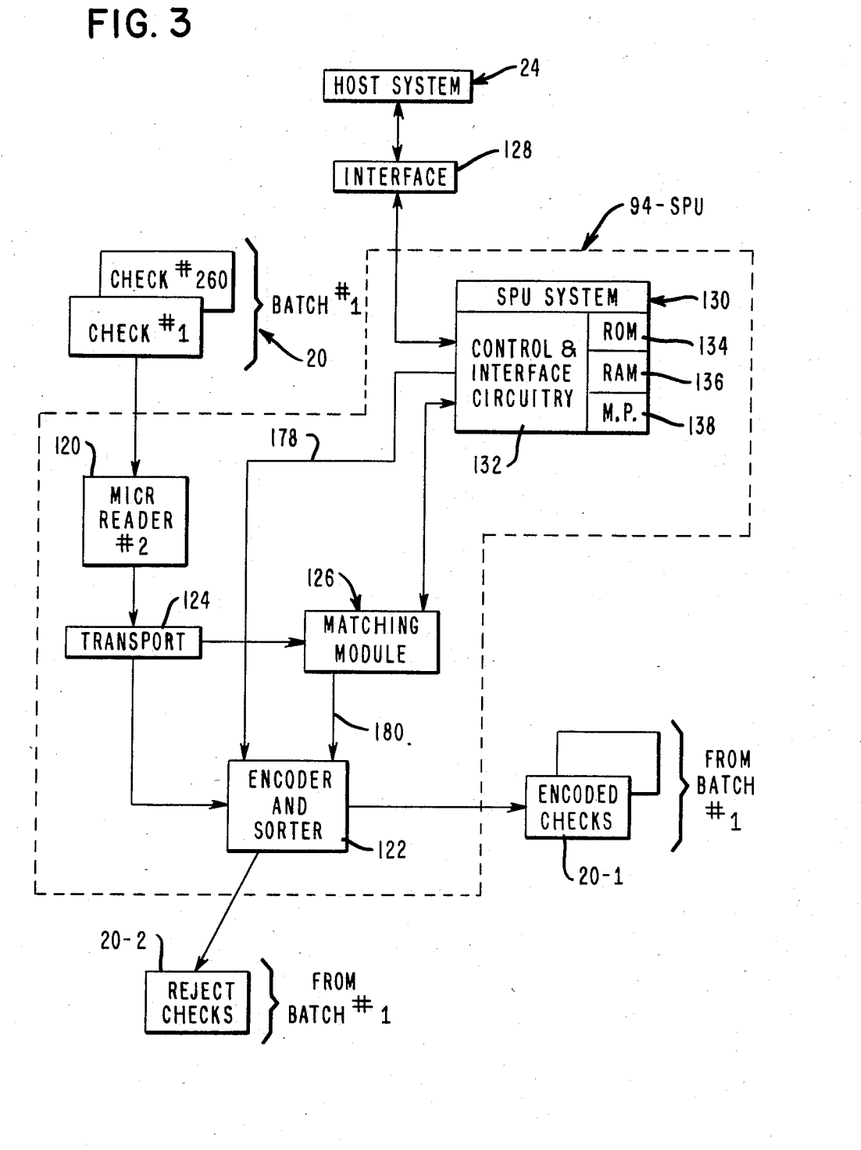
FIG. 3 is a schematic diagram in block form of a preferred embodiment of this invention, showing a SPU at which the batch of checks is read; a second reading of the MICR line for each check is compared with elements of the first reading in a matching module.

After the above quantities are calculated, a final step in the waveform matching of this invention is begun. The final step is to apply a set of tests which will allow a pass/fail decision to be made by the matching module 126. The pass/fail decision is made by the matching module 126 with regard to a check which is located at the encoder and sorter 122 (FIG. 3). In the embodiment described, the particular check is encoded with the associated monetary amount if a pass decision is made. If a fail decision is made, the check is rejected into batch 20-2.

The tests for the pass/fail decision are handled by module control 154 (FIG. 7) in the following order:

1. Reject the check if the total number of unmatchable peaks over all the 12 characters is greater than [0].

2. Accept or pass the check if the average distance per character is $\leq [2.0]$.

3. Reject the check if the average distance per character is $> [20.0]$.

4. Perform the following tests on the character having the largest distance:
  (a) Pass the check if the $D_{Total}$ distance is $\leq [25]$.
  (b) Pass the check if the average distance for the features ($\Delta y_i$) of this character in the y direction only is $\leq 3.0$.
  (c) Pass the check if the ratio of the standard deviation (previously calculated) to the average distance for the y direction features (from (b) above) is $\geq 1.5$; otherwise, reject the check.

In the embodiment described, when a check is identified by the matching module 126 (FIG. 3) as being the expected one, the monetary amount for that check is transferred to the encoder and sorter 122 via line 178 (FIG. 3) from the SPU system 130 (FIG. 3) while the processor 160 (FIG. 7) associated with the matching module 126 will indicate that a match is had via line 180.

Figure 9:
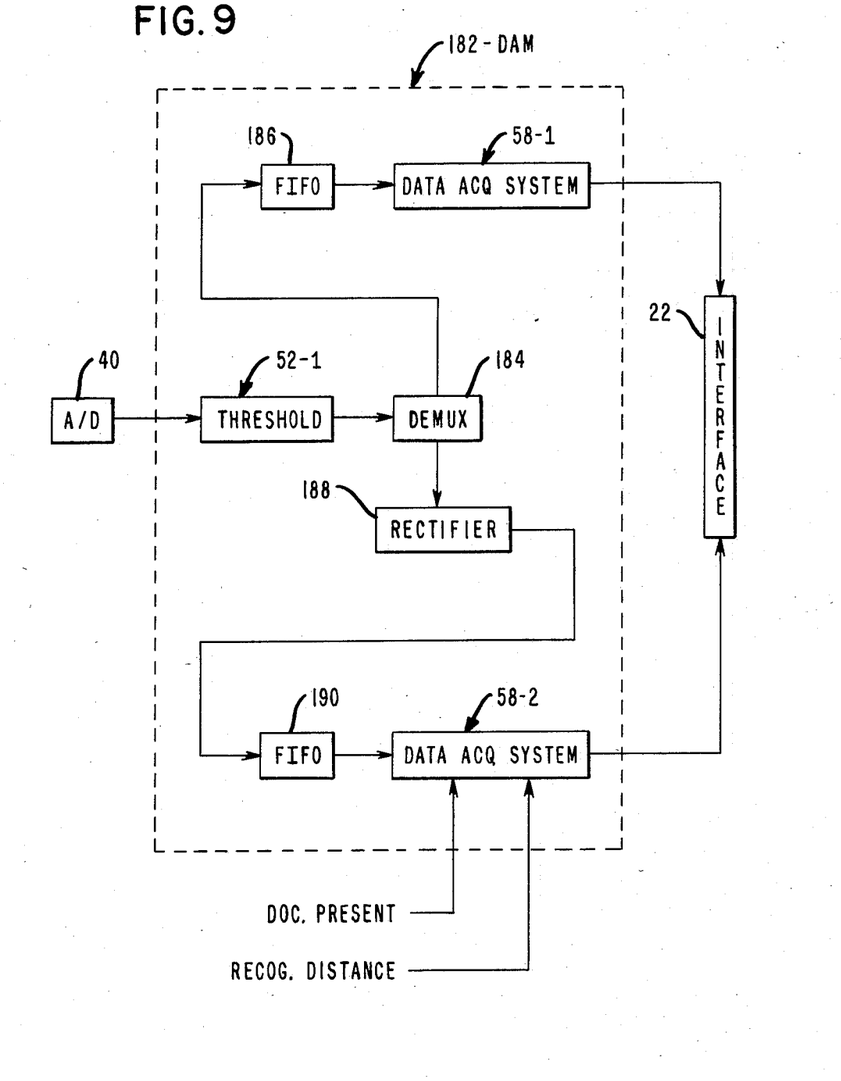
FIG. 9 is a block diagram showing a second embodiment of a Data Acquisition Module included in a First Pass Unit.

FIG. 9 shows a second embodiment of a Data Acquisition Module (DAM) designated generally as 182 which may be included in a First Pass Unit (FPU) such as 12 shown in FIG. 1. The DAM 182 receives the output from the A/D unit 40 of the reader 14 (FIG. 1) and accepts it in a threshold circuit 52-1 which is identical to 52 shown in FIG. 4. The output from the threshold circuit 52-1 is fed into a standard DEMUX circuit 184 which separates the values of waveform 86 into positive values which are stored in a FIFO 186 by sample number and routes the negative values of waveform 86 to the rectifier 188. The rectifier 188 converts the negative values of the waveform 86 into positive values which are stored in FIFO 190 by sample number. The output of the FIFO 186 is fed into the DAS 58-1 which is similar to DAS 58 (FIG. 4). Similarly, the output of FIFO 190 is fed into the DAS 58-2 which is also similar to DAS 58. The DAS 58-1 and the DAS 58-2 then perform (via software) the various functions already explained with regard to the peak detector 54 (FIG. 4). The data for the 12 characters selected (out of 30) to identify a particular check or document is then forwarded to the interface 22 which forwards the data to the host system 24 as previously described. The various equations mentioned earlier herein may be implemented by software associated with the DAS 58-1 and 58-2. One of the two DASs like 58-2 may be used for obtaining the recognition distances and a document present signal as previously explained.

We claim:

1. A method of matching first magnetic waveforms and second magnetic waveforms, each having identifiable features used for identification purposes, comprising the steps of:

(a) obtaining from each said first magnetic waveform those of said identifiable features which are significant, with significant meaning those identifiable features providing the largest recognition distances as used in "matching template" character recognition; said significant identifiable features having values and locations with respect to a starting point of the associated said first waveform, with said significant identifiable features being obtained according to predetermined criteria;

(b) utilizing said values and locations of said significant identifiable features of said first waveform to search in anticipated locations for anticipated corresponding identifiable features in a second magnetic waveform;

(c) determining the values and locations of said identifiable features of said second magnetic waveform, if any, found in said anticipated locations; and (d) comparing via comparing circuitry the values and locations from said determining step with the values and locations of said significant identifiable features of a said first magnetic waveform according to second predetermined criteria to determine whether or not the second magnetic waveform matches a said first magnetic waveform.

2. The method as claimed in claim 1 in which said step (a) includes the step of:
(a-1) thresholding said first magnetic waveforms to define windows, with each said window being associated with a portion of an associated said first magnetic waveform and with each said window having a starting location and an ending location with reference to a starting point in the associated said first magnetic waveform, each said significant identifiable feature being located in one of said windows.

3. The method as claimed in claim 2 in which said step (a) also includes the step of:
(a-2) selecting less than all said identifiable features in a said first magnetic waveform according to said predetermined criteria to obtain said significant identifiable features.

4. The method as claimed in claim 1 in which said anticipated locations represent windows, with each said window including a portion of the associated second magnetic waveform, and with each said window having a starting location and an ending location with reference to a starting point of the associated second magnetic waveform, and in which said step (b) includes the step of:
(b-1) adjusting the widths of said windows as the locations of the windows become more distant from the associated said starting point for the associated said second magnetic waveform.

5. The method as claimed in claim 4 in which said first magnetic waveforms and said second magnetic waveforms are of a type which is printed in magnetic ink and associated with MICR data, and with said identifiable features being peaks in said first and second magnetic waveforms, and in which said step (b) also includes the step of:
(b-2) adjusting the height of said windows when the intensity of the magnetic ink associated with a said first magnetic waveform is below a predetermined level.

6. The method as claimed in claim 5 in which said step (b) includes the steps of:
(d-1) calculating a difference amount, hereinafter referred to as a "y" distance, by which an anticipated said value associated with a said second magnetic waveform from step (c) differs from the corresponding said value associated with said first magnetic waveform from step (b);
(d-2) calculating a difference amount, hereinafter referred to as an "x" distance by which an anticipated said location of an identifiable feature associated with a said second magnetic waveform from step (c) differs from the corresponding said location associated with said first magnetic waveform from step (b); and
(d-3) using said y and x distances to provide an average distance for each said second magnetic waveform, which said average distance is used as a factor in said second predetermined criteria in determining whether or not the second magnetic waveform matches a said first magnetic waveform.

7. The method as claimed in claim 6 in which said step (a) includes the step of:
(a-1) sensing a MICR line on a document to obtain said first magnetic waveforms; and said step (b) also includes the step of:
(b-3) sensing a MICR line on a document in a sensing operation subsequent in time to said step (a) to obtain said second magnetic waveforms.

8. A method of matching first magnetic waveforms and second magnetic waveforms for identification purposes, comprising the steps of:
(a) obtaining from a said first waveform at least first and second identifiable features whose locations therein can be referenced with respect to a starting point in the associated said first magnetic waveform;
(b) utilizing said first identifiable features to define windows, with each said window being associated with a portion of the associated said first magnetic waveform, and with each said window having a starting location and an ending location with reference to the associated said starting point;
(c) determining said second identifiable features within an associated window according to predetermined criteria and also determining their locations with reference to said starting point;
(d) storing values representing the most significant ones, as determined by second predetermined criteria, of said second identifiable features and their locations with reference to said starting point for said windows for each said first magnetic waveform, said second magnetic waveforms also having said second identifiable features said second identifiable features meaning those which provide the largest recognition distances as used in "matching template" character recognition;
(e) using said values and their locations from step (d) of a said first magnetic waveform to search in anticipated locations for anticipated corresponding said second identifiable features in an anticipated corresponding second magnetic waveform;
(f) determining the values and locations of said second identifiable features, if any, found in said anticipated locations; and
(g) comparing via comparing circuitry the values and locations of said second identifiable features of a said second magnetic waveform obtained from step (f) with the values and locations of said second identifiable features of a said first magnetic waveform according to a third predetermined criteria to determine whether or not a said second magnetic waveform matches a said first magnetic waveform.

9. The method as claimed in claim 8 in which said step (a) includes the step of:
(a-1) thresholding said first magnetic waveforms to obtain said first identifiable features.

10. The method as claimed in claim 9 in which said step (d) includes the step of:
(d-1) selecting less than all said second identifiable features in a said first magnetic waveform according to said second predetermined criteria to obtain said significant ones of said second identifiable features of said first magnetic waveform.

11. The method as claimed in claim 10 in which said predetermined locations represent windows, with each said window including a portion of the associated second magnetic waveform, and with each said window having a starting location and an ending location with reference to the starting point of the associated second magnetic waveform, and in which said step (e) includes the step of:
(e-1) adjusting the width of said windows as the locations of the windows become more distant from the associated said starting point for the associated said second magnetic waveform.

12. The method as claimed in claim 11 in which said first and second magnetic waveforms are of a type which is printed in magnetic ink and associated with MICR data, and with said second identifiable features being peaks in said first and second magnetic waveforms, and in which said step (e) also includes the step of:
- (e-2) adjusting the height of said windows when the intensity of the magnetic ink associated with a said first magnetic waveform is below a predetermined level.

13. The method as claimed in claim 12 in which said step (g) includes the steps of:
- (g-1) calculating a difference amount, hereinafter referred to as a "y" distance, by which an anticipated said value associated with a said second magnetic waveform from step (f) differs from the corresponding said value associated with said first magnetic waveform from step (e);
- (g-2) calculating a difference amount, hereinafter referred to as an "x" distance by which an anticipated said location of an identifiable feature associated with a said second magnetic waveform from step (f) differs from the corresponding said location associated with said first magnetic waveform from step (e); and
- (g-3) using said y and x distances to provide an average distance for each said second magnetic waveform, which said average distance is used as a factor in said third predetermined criteria in determining whether or not the second magnetic waveform matches a said first magnetic waveform.

14. The method as claimed in claim 8 in which said step (a) includes the step of:
- (a-1) sensing a MICR line on a document to obtain said first magnetic waveforms; and in which said step (e) also includes the step of:
- (e-1) sensing a MICR line on a document in a sensing operation subsequent in time to said step (a-1) to obtain said second magnetic waveforms; and in which said step (a) includes the step of:
- (a-2) selecting fewer than all the said first magnetic waveforms associated with a said document according to said predetermined criteria.

15. A system for matching first magnetic waveforms and second magnetic waveforms, each having identifiable features used for identification purposes, comprising:
means for obtaining from said first magnetic waveforms those of said identifiable features which are significant, with significant meaning those identifiable features providing the largest recognition distances as used in "matching template" character recognition; said significant identifiable features having values and locations with respect to a starting point of the associated said first magnetic waveform; with said significant identifiable features being obtained according to predetermined criteria; and
means for matching said first and second magnetic waveforms to determined whether or not a said second magnetic waveform matches a said first magnetic waveform, comprising:
means for utilizing said values and locations of said significant identifiable features of a said first waveform to search in anticipated locations for anticipated corresponding said significant identifiable features in a second magnetic waveform;
means for determining the values and locations of said significant identifiable features of said second magnetic waveform, if any, found in said anticipated locations; and
means for comparing the values and locations from said determining means with the values and locations of said significant identifiable features of a said first magnetic waveform according to second predetermined criteria to determine whether or not the second magnetic waveform matches a said first magnetic waveform.

16. The system as claimed in claim 15 in which said obtaining means includes:
means for thresholding said first magnetic waveforms to define windows, with each said window being associated with a portion of the associated said first magnetic waveform and with each said window having a starting location and an ending location with reference to a starting point in the associated said first magnetic waveform, and with each said significant identifiable feature being located in one of said windows.

17. The system as claimed in claim 15 in which said anticipated locations represent windows, with each said window including a portion of the associated second magnetic waveform, and with each said window having a starting location and an ending location with reference to a starting point of the associated second magnetic waveform, and in which said utilizing means further comprises:
means for adjusting the width of said windows as the locations of the windows become more distant from the associated said starting point for the associated said second magnetic waveform.

18. The system as claimed in claim 17 in which said first and second magnetic waveforms are of a type which is printed in magnetic ink and associated with MICR data, and in which said significant identifiable features are peaks in said first and second magnetic waveforms, and in which said utilizing means further comprises:
means for adjusting the height of said windows when the intensity of the magnetic ink associated with a said first magnetic waveform is below a predetermined level.

19. The system as claimed in claim 18 in which said comparing means includes:
means for calculating a difference amount, hereinafter referred to as a "y" distance, by which an anticipated said value associated with a said second magnetic waveform differs from the corresponding said value associated with said first magnetic waveform;
means for calculating a second difference amount, hereinafter referred to as an "x" distance by which an anticipated said location of a said significant identifiable feature associated with a said second magnetic waveform differs from the corresponding said location associated with said first magnetic waveform; and
means for using said y and x distances to provide an average distance for each said second magnetic waveform, which said average distance is used as a factor in said second predetermined criteria in determining whether or not the second magnetic waveform matches a said first magnetic waveform.

20. The system as claimed in claim 19 in which said obtaining means further comprises:

means for sensing a MICR line on a document to obtain said first magnetic waveforms; and in which said utilizing means further comprises:

second means for sensing a MICR line on a document in a sensing operation subsequent in time to that performed by said first named sensing means to obtain said second magnetic waveforms.

21. A system for matching first magnetic waveforms and second magnetic waveforms for identification purposes, comprising:

means for obtaining from said first magnetic waveforms at least first and second identifiable features whose locations therein can be referenced with respect to a starting point in the associated first said magnetic waveform said second indentifiable features meaning those which provide the largest recognition distances as used in "matching template" character recognition;

means for utilizing said first identifiable features to define windows, with each said window being associated with a portion of the associated said first magnetic waveform, and with each said window having a starting location and an ending location with reference to the associated said starting point;

means for determining said second identifiable features within an associated window according to predetermined criteria and also for determining their locations with reference to said starting point;

means for selecting and storing values representing the most significant ones, as determined by second predetermined criteria, of said second identifiable features and their locations with reference to said starting point for said windows for each said first waveform, said second magnetic waveforms also having said second identifiable features;

means for using said values and their locations from said selecting and sorting means of a said first magnetic waveform to search in anticipated locations for anticipated corresponding said second identifiable features in an anticipated corresponding second magnetic waveform;

means for determining the values and locations of said second identifiable features, if any, found in said anticipated locations; and means for comparing the values and locations of said second identifiable features of a said second magnetic waveform obtained from said determining means with the values and locations of said second identifiable features of a said first magnetic waveform according to third predetermined criteria to determine whether or not a said second magnetic waveform matches a said first magnetic waveform.

22. A system for matching digitized first magnetic waveforms and digitized second magnetic waveforms, each having identifiable features used for identification purposes, comprising:

a first reader for reading a batch of documents having MICR data in magnetic ink thereon and also for producing said digitized first magnetic waveforms having said identifiable features;

a data acquisition module for obtaining from said first magnetic waveforms those of said identifiable features which are significant, with significant meaning those identifiable features providing the largest recognition distances as used in "matching template" character recognition; said significant identifiable features having values and locations with respect to a starting point of the associated said first magnetic waveform, with said significant identifiable features being obtained according to predetermined criteria;

a host system for receiving and storing said values and locations for said first magnetic waveforms;

a second reader for reading said batch of documents as a time subsequent to the reading at said first reader for producing said digitized second magnetic waveforms having said identifiable features;

a matching module for utilizing said values and locations of said first magnetic waveforms received from said host system to search in anticipated locations for anticipated corresponding said significant identifiable features of a said second magnetic waveform obtained from said second reader, and also for comparing said values and locations obtained from a search of said anticipated locations with said significant identifiable features of a first magnetic waveform according to a second predetermined criteria to determine whether or not the second magnetic waveform matches a said first magnetic waveform, and also for producing an output signal in accordance therewith.

23. The system as claimed in claim 22 in which said data acquisition module further comprises:

means for thresholding said first magnetic waveforms to define windows, with each said window being associated with a portion of the associated said first magnetic waveform and with each said window having a starting location and an ending location with reference to a starting point in the associated said first magnetic waveform, and with each said significant identifiable feature being located in one of said windows.

24. The system as claimed in claim 22 in which said anticipated locations represent windows, with each said window including a portion of the associated second magnetic waveform, and with each said window having a starting location and an ending location with reference to a starting point of the associated second magnetic waveform, means for adjusting the width of said windows as the locations of the windows become more distant from the associated said starting point for the associated said second magnetic waveform.

25. The system as claimed in claim 24 in which said significant identifiable features are peaks in said first and second magnetic waveforms, and in which said matching module further comprises:

means for adjusting the height of said windows when the intensity of the magnetic ink associated with a said first magnetic waveform is below a predetermined level.

26. The system as claimed in claim 24 in which said matching module also includes:

means for calculating a difference amount hereinafter referred to as a "y" distance, by which an anticipated said value associated with a said second magnetic waveform differs from the corresponding said value associated with said first magnetic waveform;

means for calculating a second difference amount, hereinafter referred to as an "x" distance by which an anticipated said location of an identifiable feature associated with a said second magnetic waveform differs from the corresponding said location associated with said first magnetic waveform; and means for using said y and x distances to provide an average distance for each said second magnetic waveform, which said average distance is used as a factor in said second predetermined criteria in determining whether or not a said second magnetic waveform matches a said first magnetic waveform.

27. The system as claimed in claim 22 further comprising an encoder which encodes predetermined data on a document of said batch of documents when said output signal indicates that an associated group of said second magnetic waveforms match a corresponding associated group of said first magnetic waveforms.

28. The system as claimed in claim 22 in which said first reader produces both positive and negative portions of said first magnetic waveforms and said data acquisition module includes means for detecting peaks in said first magnetic waveforms and for obtaining said significant identifiable features in both the positive and negative portions of said first magnetic waveforms.

29. The system as claimed in claim 22 in which said data acquisition module includes a demultiplexer for handling said positive and negative portions.

* * * * *